United States Patent
Chen et al.

(10) Patent No.: US 9,218,404 B2
(45) Date of Patent: Dec. 22, 2015

(54) REPLICATION SUPPORT FOR HETEROGENEOUS DATA TYPES

(75) Inventors: Hai-Yan Chen, Shanghai (CN); Stephen Shepherd, Lakewood, CO (US)

(73) Assignee: Sybase, Inc., Dublin, CA (US)

( * ) Notice: Subject to any disclaimer, the term of this patent is extended or adjusted under 35 U.S.C. 154(b) by 52 days.

(21) Appl. No.: 13/302,272

(22) Filed: Nov. 22, 2011

(65) Prior Publication Data

US 2013/0132345 A1    May 23, 2013

Related U.S. Application Data

(60) Provisional application No. 61/493,798, filed on Jun. 6, 2011.

(51) Int. Cl.
*G06F 17/30* (2006.01)
*G06F 15/16* (2006.01)

(52) U.S. Cl.
CPC .............................. *G06F 17/30575* (2013.01)

(58) Field of Classification Search
None
See application file for complete search history.

(56) References Cited

U.S. PATENT DOCUMENTS

| | | | |
|---|---|---|---|
| 5,634,124 A * | 5/1997 | Khoyi et al. | 1/1 |
| 6,748,388 B1 * | 6/2004 | Kasamsetty et al. | 1/1 |
| 2005/0114405 A1 * | 5/2005 | Lo | 707/200 |
| 2010/0131925 A1 * | 5/2010 | Gutfleisch | 717/113 |
| 2012/0158655 A1 * | 6/2012 | Dove et al. | 707/627 |

* cited by examiner

*Primary Examiner* — Alex Gofman
(74) *Attorney, Agent, or Firm* — Sterne, Kessler, Goldstein & Fox PLLC

(57) ABSTRACT

A method, system and computer readable storage medium for replicating database data of heterogeneous data type are disclosed. The method includes determining the data type of an element of heterogeneous data type to be replicated. The element is packed into a predetermined transfer format as an opaque data type, based on the determined data type, and replicated to a replication server. The replication server is instructed to not modify the element noted as opaque.

14 Claims, 6 Drawing Sheets

302

| Type Name |
|---|
| Varchar |
| Varchar2 |
| NVarchar2 |
| Char |
| Bfile |
| BINARY DOUBLE |
| BINARY FLOAT |
| NChar |
| Numeric |
| Date |
| Raw |
| Timestamp |
| TimestampTZ |
| TimestampLTZ |
| IntervalDS |
| IntervalYM |
| UROWID |
| Ref |
| Object |
| NESTED TABLE |
| VARRAY |

FIG. 3

REPLICATION SUPPORT FOR HETEROGENEOUS DATA TYPES

CROSS-REFERENCE TO RELATED APPLICATIONS

This application claims the benefit of U.S. Provisional Application No. 61/493,798 filed Jun. 6, 2011, which is incorporated by reference in its entirety.

BACKGROUND OF THE INVENTION

1. Field of the Invention

The invention relates generally to databases and more specifically to supporting replication of database data of heterogeneous data type.

2. Background Art

A replication agent allows an organization using a database to replicate information in data sources to other databases. For example, a replication agent replicates data from a primary database to a replicate database. After replication, the replicate database contains accurate and current copies of the subsets of data found in the primary database. When a table in the primary database is marked for replication, replication agent replicates transactions that manipulate the marked table.

Data stored in a source or primary database may be stored in columns of various data types, such as a Boolean data type, integer data type, binary data type, etc. However, certain databases allow columns with heterogeneous data types. Data stored in a column of heterogeneous data type may vary between different data formats. Therefore, what is needed are systems, methods, and computer program products that allow a replication agent to properly replicate heterogeneous data without modifying the underlying data.

BRIEF SUMMARY OF THE INVENTION

Embodiments of the invention include systems, methods and computer-readable mediums for supporting replication of database data of heterogeneous data type in a first database by a replication agent. The replication agent is provided with a set of rules for conversion of data. The replication agent determines the data type of an element of heterogeneous data type. The replication agent packs the element into a predetermined transfer format such that it will not be modified during replication, based on the determined data type and the set of rules. The replication agent then replicates the packed element to a replication server. The replication server may ignore the data type of the element.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

FIG. 3 is an example table of data types in a column of heterogeneous data type for which replication may be supported.

Figure 1:
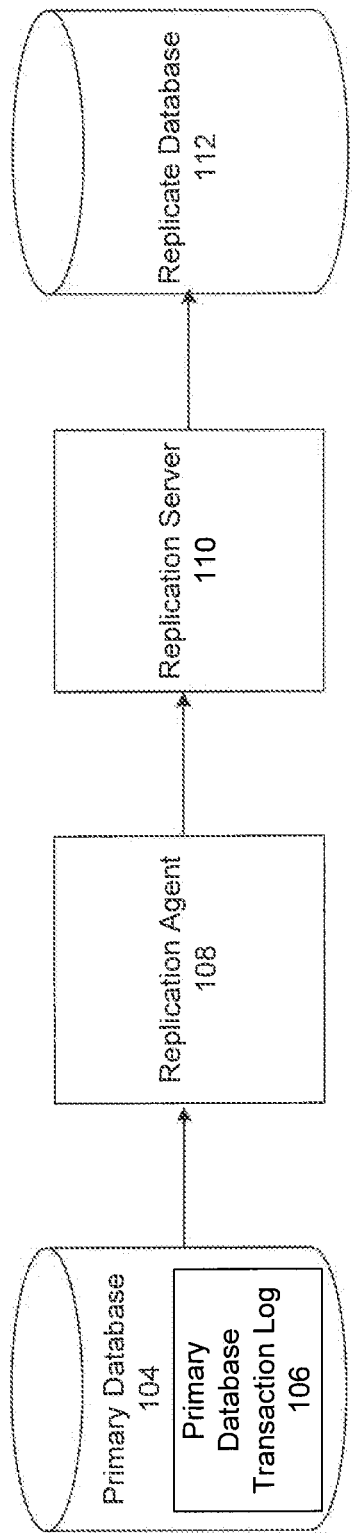
FIG. 1 is a block diagram of an exemplary database replication system.

The invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

FIG. 1 is a block diagram of an exemplary database replication system 100. Database replication system 100 includes a primary database 104, a replication agent 108, a replication server 110, and a replication database 112.

Primary database 104 may be any type of a database and may include, but is not limited to, a device having a processor and a memory for executing and storing instructions. Primary database 104 may include software, firmware and hardware or any combination thereof. The software may include one or more applications that create, delete and modify database tables and the data stored in those tables. The hardware may include a processor and memory.

Primary database 104 includes tables and schemas that are defined by a developer. Primary database 104 receives transactions from a user or another computing device that may act on the tables and schemas. Those transactions also store, retrieve, modify, and manipulate data stored in primary database 104.

Database replication system 100 replicates transactions in primary database 104 to replicate databases 112. Replication agent 108 marks tables in primary database 104 that include transactions that are captured for replication. Once tables are marked for replication, transaction log 106 stores the record of the transactions that manipulate the marked tables.

Primary database transaction log 106 stores transactions marked for replication and other changes to primary database 104. Primary database transaction log 106 may be a text log, a database table, etc. Primary database transaction log 106 may be created and/or maintained by primary database 104 or replication agent 108.

Replication agent 108 replicates transactions for tables and schemas marked for replication in primary database 104. To replicate each transaction, replication agent 108 scans transaction log 106 for the relevant transaction. When replication agent 108 identifies each transaction in transaction log 106, it communicates those transactions to replication server 110. Replication agent 108 may be a standalone application that is independent of primary database 104, replication server 110 or other components in database replication system 100. Replication agent 108 may also execute on the same or different computing device as primary database 104.

Replication server 110 receives and processes transactions and data received from replication agent 108. Replication server 110 disseminates those transactions to replicate databases 112 or other replication servers 110. When replication server 110 receives transactions from replication agent 108 it delivers those transactions to replicate databases 112, where they are processed. In an embodiment, replication agent 108 provides instructions to replication server 110 for disseminating replicated transactions to replicate databases 112.

Replication server 110 may guarantee the transaction delivery. When transaction delivery is guaranteed, each transaction successfully received from replication agent 108 is guaranteed for delivery to an appropriate replicate database 112.

Replicate database 112 receives transactions from replication server 110 and updates the tables and data with the content included in the transactions. When transactions are successfully processed by replicate database 112, the state of the tables included in replicate database 112 is the same as that of the tables marked for replication on primary database 104.

Database replication system 100 may also include a network (not shown). The network may be any type of a network or combination of networks such as, but not limited to, a local area network, wide area network or the Internet Network may be any form of a wired network or a wireless network, or a combination thereof. Network allows primary database 104, replication agent 108, replication server 110 and replication database 112 to communicate among each other, as well as other modules and components.

Replicating Transactions on a Replication Agent

Replication of data from one database to one or more separate database may involve a replication agent and a replication server. A replication agent may capture changes made to a database. A replication server may distribute the changes captured by the replication agent to the separate databases. The replication agent may convert the changes and transactions captured into a format that the replication server can interpret.

Figure 2A:
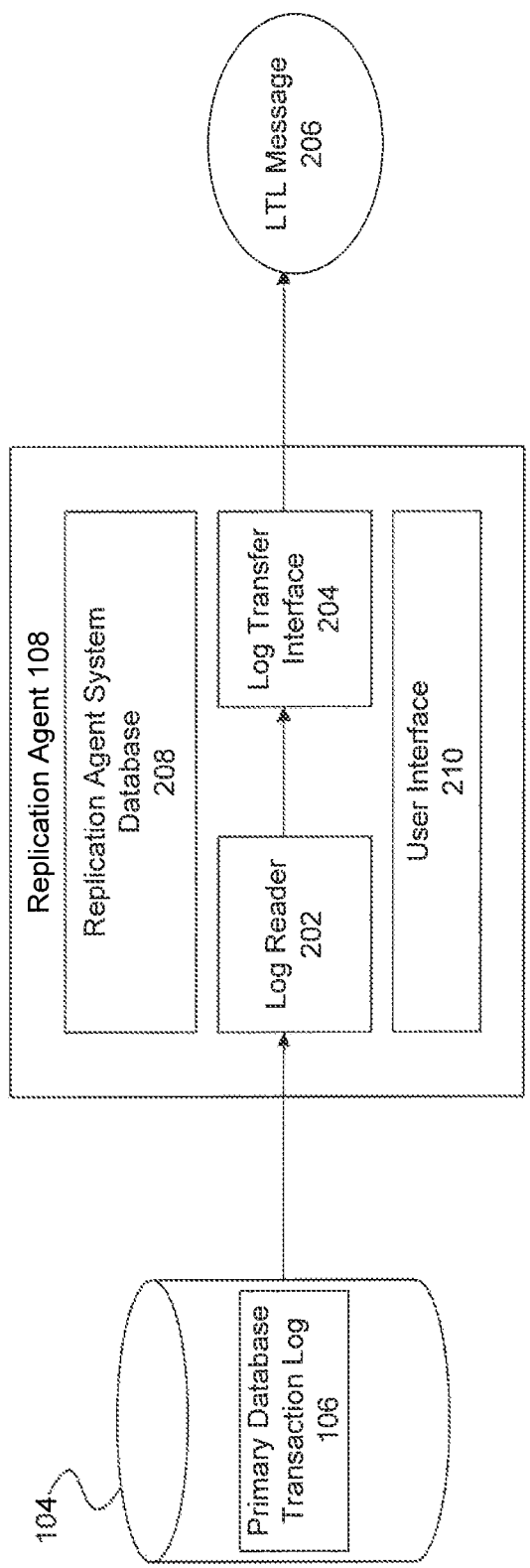
FIG. 2A is a block diagram of an exemplary embodiment of replication agent.

FIG. 2A is a block diagram of an exemplary embodiment 200 of replication agent 108. Replication agent 108 may be implemented by, for example, the Sybase Replication Agent product from Sybase, Inc. of Dublin, Calif. However, replication agent 108 is not limited to this example implementation. As described herein, replication agent 108 captures transactions from primary database 104 and replicates those transactions to replication server 110. Replication agent 108 further includes a log reader 202, a log transfer interface 204, a replication agent system database (RASD) 208 and a user interface 210. Log reader 202 retrieves transactions from primary database transaction log 106 in primary database 104 and generates a change data set. Log reader 202 passes the change data set to log transfer interface 204.

Log transfer interface 204 receives the change data set from log reader 202. Log transfer interface 204 uses the log transfer language (LTL) to encapsulate the change data set into an LTL message 206. Once LTL message 206 is generated, log transfer interface 204 sends LTL message 206 to primary replication server 110.

Figure 2B:
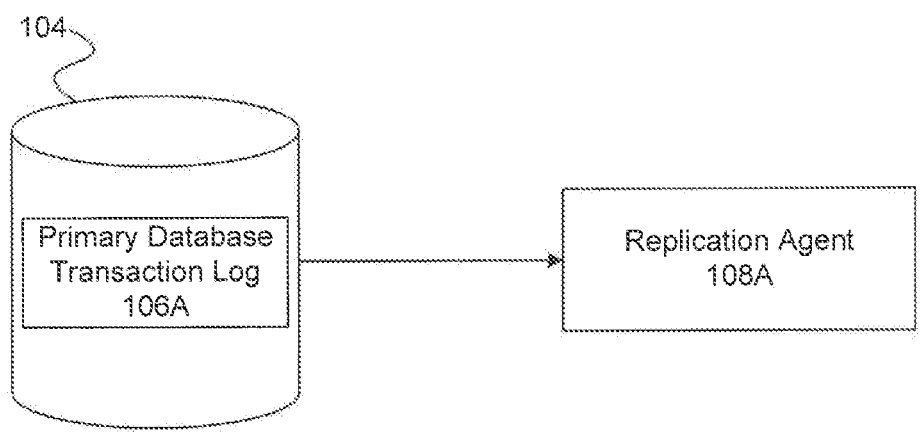
FIG. 2B is a block diagram of an exemplary embodiment of a trigger-based replication agent.

Replication agent 108 may be a trigger-based replication agent 108a. FIG. 2B is an exemplary embodiment of a trigger-based replication agent 108a. Trigger-based replication agent 108a uses triggers on marked tables in primary database 104 to capture transactions for replication. The triggers also record other information that replication agent 108a requires to replicate a transaction, such as a transaction ID that identifies the operations associated with the transaction. The triggers record the data that requires replication in primary database transaction log 106a in primary database 104.

When a user marks a table or stored procedure for replication, replication agent 108a creates the data-capture triggers in primary database 104. Similarly, replication agent 108a removes the data-capture triggers from the marked table or procedure when a user decides that replication is no longer required, as indicated by appropriate updates to the primary database 104. As discussed above, primary database transaction log 106a may store transactions for replication by replication agent 108a.

Typically, database columns have an assigned data type, such as a Boolean data type, integer data type, string data, type, or any other data type. Certain database types allow for data of heterogeneous data types to be stored in the same column. For example, Oracle databases have support for columns of type ANYDATA, Columns of type ANYDATA may store characters, dates, timestamps, and many other data types in the same column.

FIG. 3 is an example table 302 of various data types supported by an Oracle ANYDATA column. For example, these data types include varchar data, numeric data, date data, and other formats.

Thus, in an Oracle database table, a first row may have an element of data in the ANYDATA column of type date, with a value of 2009-09-10 12:45:32. A second row may have an element of data in the ANYDATA column of type number, with a value of 37. A third row may have an element of data in the ANYDATA column of type varchar, with a value of "aaa". It is noted that while reference is made to Oracle ANYDATA, embodiments of the invention are not limited to this example but are instead applicable to other columns with similar or comparable heterogeneous data type functionality.

In order to preserve the integrity of data, a replication server may ordinarily impose stringent typing requirements on data to be replicated. Additionally, in the replication process, a replication server may modify or translate data to ensure it complies with certain requirements. However, for database data of heterogeneous data type, such stringent typing requirements may need to be relaxed. Further, in order to support replication of such database data of heterogeneous data type, replication servers must be instructed to not query or modify the data present in the heterogeneous data type column. A replication server may be instructed to ignore the contents of a data element, for example and without limitation, if the data element is identified as an opaque data type. Thus, a replication agent working in conjunction with the replication server may be responsible for properly formatting, qualifying, and delimiting data such that the replication server considers the element as opaque.

Figure 4:
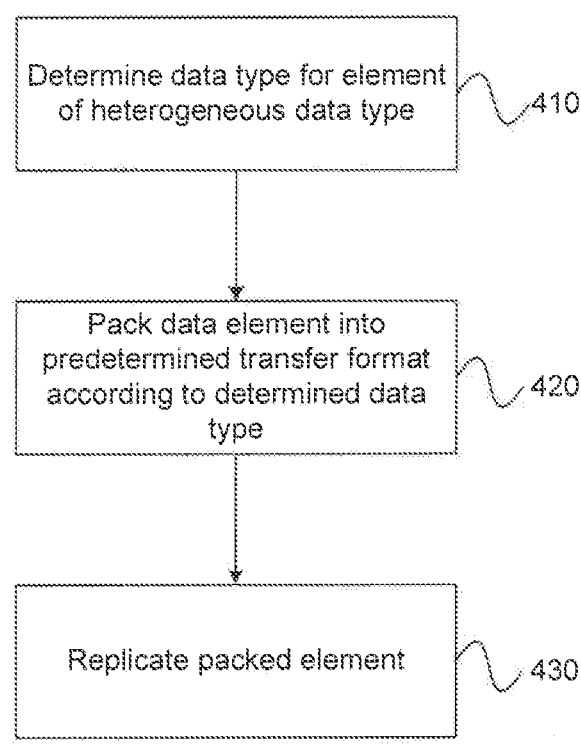
FIG. 4 is a flowchart of an exemplary method for replicating database data of heterogeneous data type.

FIG. 4 is a diagram of a method 400 for replicating database data of heterogeneous data type. Method 400 may be implemented, for example and without limitation, by a replication agent.

At step 410, the data type for an element of heterogeneous data type to be replicated is determined. For example, the column may be of type ANYDATA, and the element may be of type integer.

At step 420, based on the determined data type of the element, the element of data is packed into a predetermined transfer format, such that it will not be modified during replication. The element may be packed into a predetermined transfer format such as Log Transfer Language (LTL) as described above by a log transfer interface 204. Packing the element accordingly may ensure that a replication server does not modify the element. The packing step is described further below with respect to embodiments.

At step 430, the packed element is replicated. In embodiments, the packed element may be passed to a replication server, which may replicate the element to one or more replicate databases 112 or replication servers 110.

As an example, a particular table in a source database may be marked for replication. The table may have two or more columns, and one of the columns may be of type ANYDATA. Thus, when replicating a row of data in the table, a replication agent implementing method 400 may be utilized to replicate the data stored in the ANYDATA column.

In an embodiment, a replication agent as described herein may only support replication of columns of heterogeneous data types where the source and destination of such data are the same type of system. For example, replication of columns of heterogeneous data types may only be supported from Oracle to other Oracle systems or from Sybase to other Sybase systems.

Replication of database data of heterogeneous data type may also not be supported if the replicate database does not have a column of heterogeneous data type. That is, for example, when replicating from a primary database having an ANYDATA column, if the replicate database does not have an ANYDATA column, replication may not be supported. The replication server may report an error in this situation.

Further, in an embodiment, a replication agent as described herein may not support replication of database data of heterogeneous data type that exceed a particular size. For example, ANYDATA elements greater than 16 kilobytes may not be replicated.

For database data of heterogeneous data type, a replication server may treat the database data as an "opaque" data format. As stated above, this ensures that an element is not modified when being replicated. Further, the replication server may not perform a character set conversion for data or elements of opaque data type, further ensuring data consistency.

In order to ensure that the replication server treats the database data of heterogeneous data type as opaque, for example, a replication definition may be specified in the replication server configuration that instructs the replication server to treat ANYDATA as opaque.

In embodiments, columns of heterogeneous data type may be restricted such that the column may not be used as a primary key column, a searchable column, or a column with an automatically created table replication definition.

As described above with respect to step 420 of method 400, in order for the replication server to recognize the replicated database data of heterogeneous data type as opaque, the replication agent may be tasked with packing the data properly before it can be sent to the replication server, so that the replication server does not modify or translate the data.

The syntax for properly packing an element of heterogeneous data type, such as an ANYDATA element, may include, for example, an ANYDATA modifier prefix, a type modifier prefix, the value of the data field, a type modifier postfix, and an ANYDATA modifier postfix.

The field value may contain the value of the ANYDATA element that has been parsed by the replication agent for the redo log. The redo log may refer to a file which logs a history of all changes made to a database. Thus, the field value contains the value of the ANYDATA element such that the redo log contains the values of all changes made to the database. For certain types of ANYDATA, such as OBJECT instances, the field value may be delimited and formatted with its internal schema.

The type modifier prefix and type modifier postfix may be appended before and after the field value to transfer the field value to a special built-in data type specific to the database. The type modifier prefix and postfix may be specified, for example, for field values that represent dates to convert the date such that it is recognized by the replicate database.

The ANYDATA modifier prefix and postfix may be appended before and after the built-in type stored in the ANYDATA column in an ANYDATA instance. Thus, the replicate database will recognize the data as ANYDATA and store it properly in a column of ANYDATA type. Further, the replication server 110, when provided with the proper replication definition, as detailed above, will treat the data as opaque.

A replication agent 108 may send information in log transfer language, or LTL, to a replication server 110 to distribute changes. Thus, a log transfer interface 204 may use the syntax specified above to pack the element of ANYDATA into the LTL. Properly packing or formatting data according to the LTL is vital for ensuring that changes to the databases are accurately tracked and can be reviewed, rolled back, or applied in case of failure.

Appropriate syntax to properly format data according to the LTL may be provided for each type of database data that may be supported in a column of heterogeneous data type.

As an example, for varchar data, the type modifier prefix and postfix may not specify any changes to the varchar data, and thus may simply be an open and close single quotation mark. The ANYDATA modifier prefix may read, for example and without limitation, sys.anydata.convertvarchar(', such that the replicate database recognizes the data as ANYDATA. The ANYDATA modifier postfix may simply be a close quote and parentheses.

Thus, for a varchar element "aaa" stored in a column of heterogeneous data type, the packed LTL may read sys.anydata.convertvarchar('aaa'), according to the type modifier prefix and postfix and ANYDATA modifier prefix and postfix detailed above.

For certain database data of heterogeneous data type, the type modifier prefix and postfix may specify a function to properly convert the database data such that it can be recognized by the replication server or replicate database. Thus, for example, the type modifier prefix for a date value may read to_date(', while the type modifier postfix may read ', 'yyyy-mm-dd hh24:mi:ss'). The ANYDATA modifier prefix may be sys.anydata.convertdate(', while the ANYDATA modifier postfix may be a close quote and parentheses.

Thus, for a date element having a value of "2009-04-07 13:23:44" stored in a column of heterogeneous data type, the packed LTL may read sys.anydata.convertdate(to_date ('2009-04-07 13:23:44', 'yyyy-mm-dd hh24:mi:ss')). Thus, the type modifier prefix, type modifier postfix, ANYDATA modifier prefix, and ANYDATA modifier postfix may be appended to the element's value in the packed LTL for the value. The element may then be provided to and replicated by a replication server. In accordance with embodiments, the replication server may not query or modify the data element, and may replicate the data element to a replicate database.

In an embodiment, certain data types that may be stored in an ANYDATA column may be unsupported. For example, the ANYDATA column may support data of type BLOB. However, the replication agent may not support replication of BLOB data. Other types of data that may not be supported include other LOB file types such as CLOB and NCLOB. Thus, in a configuration file for a replication agent, a flag or parameter may be set that instructs the replication agent to ignore unsupported data. If this flag is not set, the replication agent may report an error when attempting to replicate this data. This flag may be checked when an object is marked to be replicated.

For example, using a parameter named pdb_ignore_unsupported_anydata, a user may specify whether a replication agent should ignore data for unsupported data types stored in an ANYDATA column. The default value of this parameter may be false.

If the parameter is set to false, upon attempting to replicate unsupported data, a string such as "type not supported" may be sent for unsupported data types. Upon receipt of such a string, a replication server may fail, which in turn may require human intervention or correction at the replicate database for each row containing unsupported data. If the parameter is set to true, the column value may be ignored, and no value or a default value may be sent to a replication server. Upon replication, the replicate database may be out of sync with the primary database.

In a further embodiment, a built in function may be used to determine the data type of an element of heterogeneous data type. For example, certain databases may provide a function which may be used to determine the data type of elements of data in ANYDATA columns. This function may be used to determine whether an ANYDATA column contains an unsupported data type.

Computer System

Figure 5:
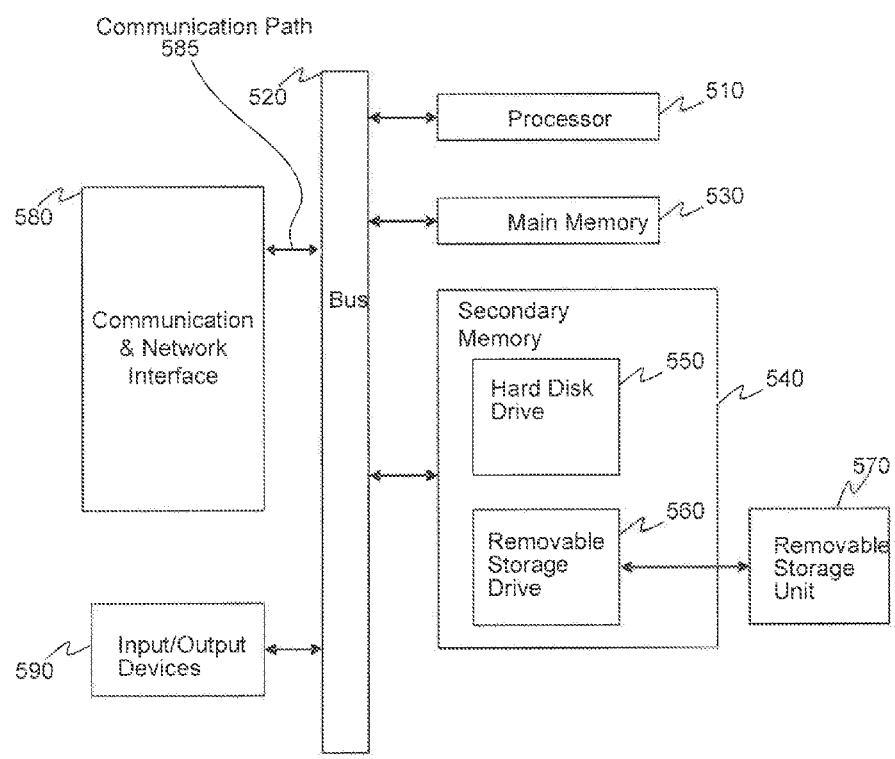
FIG. 5 is an example computer system in which embodiments of the invention can be implemented.

Various aspects of the invention can be implemented by software, firmware, hardware, or a combination thereof. FIG. 5 illustrates an example computer system 500 in which the invention, or portions thereof, can be implemented as computer-readable code. For example, the methods illustrated by flowcharts described herein can be implemented in system 500. Various embodiments of the invention are described in terms of this example computer system 500. After reading this description, it will become apparent to a person skilled in the relevant art how to implement the invention using other computer systems and/or computer architectures.

Computer system 500 includes one or more processors, such as processor 510. Processor 510 can be a special purpose or a general purpose processor. Processor 510 is connected to a communication infrastructure 520 (for example, a bus or network).

Computer system 500 also includes a main memory 530, preferably random access memory (RAM), and may also include a secondary memory 540. Secondary memory 540 may include, for example, a hard disk drive 550, a removable storage drive 560, and/or a memory stick. Removable storage drive 560 may comprise a floppy disk drive, a magnetic tape drive, an optical disk drive, a flash memory, or the like. The removable storage drive 560 reads from and/or writes to a removable storage unit 570 in a well known manner. Removable storage unit 570 may comprise a floppy disk, magnetic tape, optical disk, etc. which is read by and written to by removable storage drive 560. As will be appreciated by persons skilled in the relevant art(s), removable storage unit 570 includes a computer usable storage medium having stored therein computer software and/or data.

In alternative implementations, secondary memory 540 may include other similar means for allowing computer programs or other instructions to be loaded into computer system 500. Such means may include, for example, a removable storage unit 570 and an interface (not shown). Examples of such means may include a program cartridge and cartridge interface (such as that found in video game devices), a removable memory chip (such as an EPROM, or PROM) and associated socket, and other removable storage units 570 and interfaces which allow software and data to be transferred from the removable storage unit 570 to computer system 500.

Computer system 500 may also include a communications and network interface 580. Communications interface 580 allows software and data to be transferred between computer system 500 and external devices. Communications interface 580 may include a modem, a communications port, a PCM-CIA slot and card, or the like. Software and data transferred via communications interface 580 are in the form of signals which may be electronic, electromagnetic, optical, or other signals capable of being received by communications interface 580. These signals are provided to communications interface 580 via a communications path 585. Communications path 585 carries signals and may be implemented using wire or cable, fiber optics, a phone line, a cellular phone link, an RF link or other communications channels.

The network interface 580 allows the computer system 500 to communicate over communication networks or mediums such as LANs. WANs the Internet, etc. The network interface 580 may interface with remote sites or networks via wired or wireless connections.

In this document, the terms "computer program medium" and "computer usable medium" and "computer readable medium" are used to generally refer to media such as removable storage unit 570, removable storage drive 560, and a hard disk installed in hard disk drive 550. Signals carried over communications path 585 can also embody the logic described herein. Computer program medium and computer usable medium can also refer to memories, such as main memory 530 and secondary memory 540, which can be memory semiconductors (e.g. DRAMs, etc.). These computer program products are means for providing software to computer system 500.

Computer programs (also called computer control logic) are stored in main memory 530 and/or secondary memory 540. Computer programs may also be received via communications interface 580. Such computer programs, when executed, enable computer system 500 to implement embodiments of the invention as discussed herein. In particular, the computer programs, when executed, enable processor 440 to implement the processes of the invention, such as the steps in the methods illustrated by flowcharts discussed above. Accordingly, such computer programs represent controllers of the computer system 500. Where the invention is implemented using software, the software may be stored in a computer program product and loaded into computer system 500 using removable storage drive 560 interfaces, hard drive 550 or communications interface 580, for example.

The computer system 500 may also include input/output/display devices 590, such as keyboards, monitors, pointing devices, etc.

The invention is also directed to computer program products comprising software stored on any computer useable medium. Such software, when executed in one or more data processing device(s), causes a data processing device(s) to operate as described herein. Embodiments of the invention employ any computer useable or readable medium, known now or in the future. Examples of computer useable mediums include, but are not limited to primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

The invention can work with software, hardware, and/or operating system implementations other than those described herein. Any software, hardware, and operating system implementations suitable for performing the functions described herein can be used.

CONCLUSION

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by the skilled artisan in light of the teachings and guidance.

The breadth and scope of the invention should not be limited by any of the above-described exemplary embodiments, but should be defined only in accordance with the following claims and their equivalents.

What is claimed is:

1. A method for replicating database data, comprising:
    determining, by a processor, a data type for an element of the database data, wherein the element is stored in a database column, and wherein the database column is of an heterogeneous data type;
    packing, by the processor, the element into a predetermined transfer format, wherein the packing comprises:
        packing the element with a first prefix identifying the element as the heterogeneous data type and a second prefix comprising a type prefix, based on the determined data type, wherein the second prefix is different from the first prefix; and
        packing the element with a first postfix identifying the element as the heterogeneous data type and a second postfix comprising a type postfix based on the determined data type, wherein the second postfix is different from the first postfix;
    determining, by the processor, whether replication of the element is supported based on the data type;
    if the replication of the element is unsupported, checking, by the processor, a parameter in a configuration file, wherein the parameter when set has a first or second value which determines how to proceed if the replication of the element is unsupported; and
    if the replication of the element is supported, replicating, by the processor, the packed element in the predetermined transfer format.

2. The method of claim 1, further comprising transmitting an error message if the parameter is not set.

3. The method of claim 1, further comprising transmitting a message indicating that the data type is unsupported if the parameter is set to the first value.

4. The method of claim 1, further comprising ignoring the element if the parameter is set to the second value.

5. The method of claim 1, further comprising replicating the packed element to a replicate database.

6. A replication system for replicating database data, comprising:
    a memory configured to store one or more log transfer language syntaxes;
    a log transfer interface, configured to:
        determine a data type for an element of the database data, wherein the element is stored in a database column, and wherein the database column is of an heterogeneous data type;
        pack the element into a predetermined transfer format, wherein the packing comprises:
            packing the element with a first prefix identifying the element as the heterogeneous data type and a second prefix comprising a type prefix, based on the determined data type, wherein the second prefix is different from the first prefix; and
            packing the element with a first postfix identifying the element as the heterogeneous data type and a second postfix comprising a type postfix based on the determined data type, wherein the second postfix is different from the first postfix;
        determine whether replication of the element is supported based on the data type;
        if the replication of the element is unsupported, check a parameter in a configuration file, wherein the parameter when set has a first or second value which determines how to proceed if the replication of the element is unsupported; and
    a replication module configured to replicate the packed element in the predetermined transfer format, if the replication of the element is supported.

7. The replication system of claim 6, wherein the replication module is further configured to transmit an error message if the parameter is not set.

8. The replication system of claim 6, wherein the replication module is further configured to transmit a message indicating that the data type is unsupported if the parameter is set to the first value.

9. The replication system of claim 6, wherein the replication module is further configured to ignore the element if the parameter is set to the second value.

10. The replication system of claim 6, wherein the replication module is further configured to replicate the packed element to a replicate database.

11. A non-transitory computer readable storage medium having instructions stored thereon that, when executed by a processor, cause the processor to perform operations comprising:
    determining a data type for an element of the database data, wherein the element is stored in a database column, and wherein the database column is of an heterogeneous data type to be replicated;
    packing the element into a predetermined transfer format, wherein the packing comprises:
        packing the element with a first prefix identifying the element as the heterogeneous data type and a second prefix comprising a type prefix, based on the determined data type, wherein the second prefix is different from the first prefix; and
        packing the element with a first postfix identifying the element as the heterogeneous data type and a second postfix comprising a type postfix based on the determined data type, wherein the second postfix is different from the first postfix;
    determining whether replication of the element is supported based on the data type;
    if the replication of the element is unsupported, checking a parameter in a configuration file, wherein the parameter when set has a first or second value which determines how to proceed if the replication of the element is unsupported; and
    if the replication of the element is supported, replicating the packed element in the predetermined transfer format.

12. The non-transitory computer-readable storage medium of claim 11, the operations further comprising transmitting an error message if the parameter is not set.

13. The non-transitory computer-readable storage medium of claim 11, the operations further comprising, ignoring the element if the parameter is set to the second value.

14. The non-transitory computer-readable storage medium of claim 11, wherein the replicating further comprises replicating the packed element to a replicate database.

\* \* \* \* \*